Patented Apr. 11, 1944

2,346,425

UNITED STATES PATENT OFFICE 2,346,425

STABILIZATION OF ORGANIC COMPOUNDS

Edward C. Kirkpatrick, Wilmington, Del., assignor to E. I. du Pont de Nemours & Company, Wilmington, Del., a corporation of Delaware No Drawing. Application December 24, 1940, Serial No. 371,591

3 Claims. (Cl. 260—553)

This invention relates to the stabilization of organic compounds and, more particularly, to a method involving the use of a class of materials whose presence stabilizes or prevents the decomposition of urea.

It is an object of this invention to provide a method for stabilizing or preventing decomposition of organic compounds.

Other objects and advantages of this invention will be apparent from the following specification.

According to the present invention there are added to organic compounds, which are normally unstable or which tend to decompose upon standing, or upon heat treatment, small quantities of organic compounds containing the purine ring. The purine ring is represented by the following structure:

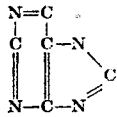

Among substances containing the purine ring are caffein, xanthine, theobromine, uric acid, hypoxanthines, guanine, adenine, and the oxidation and reduction products of the purine ring compounds such as caffeidine, desoxyxanthine and purone.

I have found that members of this family of compounds are effective in stabilizing or preventing decomposition of organic materials which are either unstable or tend to decompose under normal conditions. Thus, for example, from 0.0001 to 1.0%, based upon the weight of the organic compounds being protected, of a purine ring compound, is sufficient to protect the organic compound against decomposition or to stabilize it. The stabilization features of this invention are applicable to unstable organic compounds generally, such as neutral derivatives of carboxylic acids, for example, the amides such as urea and formamide, hydroxy esters, such as methyl hydroxyacetate or lactate and nitriles such as adiponitrile.

The applicability of the compounds of this invention for preventing rearrangement or decomposition, or for stabilizing organic compounds, can well be illustrated by the case of urea. Although this invention will not be limited by the explanation herewith given, we believe the explanation to be in accordance with the following facts. Urea may rearrange to ammonium cyanate, (NH$_4$CNO) which in turn may be converted to cyanuric acid, [(HNCO)$_3$] or to carbamyl isocyanate and biuret, (NH$_2$CONCO, and NH$_2$CONHCONH$_2$). All of these reactions are favored by elevated temperatures and all of these products are present to some extent in crude urea resulting from its synthesis from ammonia and carbon dioxide.

Urea may also be hydrolyzed to ammonium carbamate and thence to ammonium carbonate, this end product thereafter readily decomposing to ammonia and carbon dioxide. Furthermore, urea crystals recovered from crude synthesis melts are frequently coated with molten liquor. This is due to the fact that during the usual purifying operations not all the impurities are volatilized and, therefore, the dry crystals show the presence of ammonium salts and, consequently, these crystals also show volatility, alkalinity and variable pH. If dried at higher temperatures (100–115° C.) than normally employed (50–80° C.) advantage may be taken of the faster hydrolysis rate of the carbamate with the result that the carbamate and carbonate salts disappear as volatile carbon dioxide and ammonia and the initial pH of the product is lower. But at the higher temperatures urea further isomerizes, polymerizes and hydrolizes or it may hydrolyze slowly when stored as moist crystals at room temperature unless such reactions are prevented by the use of proper inhibitors.

The ideal stabilizer for urea, therefore, is one which will inhibit formation of by-products during synthesis and drying. Should any by-products be formed during synthesis, the stabilizer should permit their removal by hydrolysis and decomposition at elevated temperatures without further urea degradation. The stabilizer should also prevent urea hydrolysis during storage under other than ideal conditions. The stabilizers of the present invention fulfill these requisites and prevent the rearrangement and decomposition of urea which has otherwise been known to take place. Accordingly, the disadvantageous rearrangements, and decompositions, of urea are obviated according to this invention and cloudiness of urea solutions, which is characteristic of partially rearranged or decomposed urea, is overcome. Similarly, the presence of ammonium salts formed by decomposition of urea, which is particularly undesirable in the preparation of urea-formaldehyde condensation products, is likewise obviated.

Another illustration of the advantages of this invention is the behavior of formamide and the effects of my stabilizers thereupon. Previous attempts, reported in the literature, to determine the boiling point of formamide at atmospheric pressure have been unsuccessful due to excessive decomposition. By the use of stabilizers of the present invention, however, it has been made possible to distill formamide at atmospheric pressure and to obtain a constant vapor temperature which is in agreement with the value predicted by extrapolation of the boiling points at low pressures. This phenomenon will make possible an increase in yields in high temperature reactions involving formamide and will open up many reactions previously impractical due to excessive decomposition of formamide. The applicability of the stabilizers of this invention to formamide and prevention of its decomposition will be made more clear in the following examples.

A third application of my invention is the stabilization of organic esters of a type generally unstable at elevated temperatures. Such for instance is methyl hydroxyacetate, which upon heating condenses to an internal ester, frequently referred to as the "cyclical dimer," or to other products of the ester or ether type. The condensations are illustrated by the following:

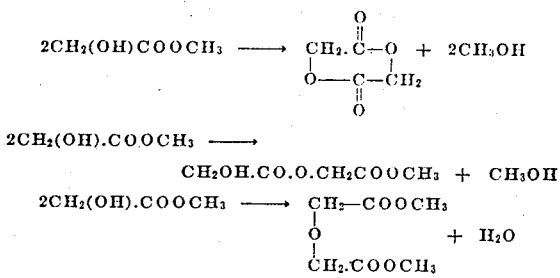

In the first two condensations methanol is a by-product, in the third case, water. Such condensations are almost completely inhibited in the presence of the stabilizing agents specified in my invention. An example is given hereafter. This stabilization effect makes possible certain high temperature processes otherwise handicapped by loss of ester or by the formation of non-volatile by-products.

A fourth and similar application of my invention is the stabilization of nitriles, of which adiponitrile is an example. On prolonged heating these compounds isomerize and perhaps decompose and polymerize. These reactions can be largely prevented by the use of very small amounts of purine derivatives as stabilizers, thus permitting distillation and rectification of such compounds and the carrying out of chemical processes at temperatures otherwise impractical.

The following examples will illustrate how the present invention may be practiced.

*Example 1*

Two samples of crude urea slurry were taken simultaneously from storage. To one sample was added 0.2 wt. per cent caffein. Both samples were centrifuged and then dried at 96–104° C. for 80 minutes. A 10% aqueous solution of the stabilized urea showed a pH of 8.31, stable over a long period. The average initial pH of the unstabilized urea was 8.96, but varied with time over a pH range of 1.0.

*Example 2*

To a 200 gram sample of crude urea slurry was added 5 parts per million of caffein. The mixture was heated to 60° to bring about complete solution. After one hour at 60°, the temperature was lowered to 0°, and the resultant crystals centrifuged and divided into two samples. One sample was dried in an oven at 100° C. for 30 minutes. The pH of a 10% aqueous solution was 8.78. The second sample was dried at 100° C. for 30 minutes and at 110° C. for 60 minutes. The pH of its 10% aqueous solution was 8.32. The water solution was clear and the pH was very sensitive to $CO_2$ contamination from the air. It is apparent that the extended heating period at elevated temperature produced a urea of lower pH, that was almost free of buffer impurities such as ammonium salts, and that this pure product was obtained without producing simultaneously undesirable by-products such as cyanuric acid or biuret.

*Example 3*

To a crude commercial urea synthesis slurry was added 10 p. p. m. of caffeine. The mixture was heated and centrifuged at 50° C. The moist crystals were fed into a 40" x 8" I. D. stainless steel rotary drier and dried with a contact time of 8 minutes. The product contained less than 0.1 part per million of combined ammonia and maintained a pH of 8.6 for two months.

This experiment was repeated without the use of stabilizer. The product contained 4 parts per million of ammonium salts. The pH of the product rose from 8.5 to 8.9 during the first two weeks in storage. The pH then dropped and had reached 7.9 at the end of the second month in storage.

*Example 4*

In an accelerated test to show the stabilizing effect of caffeine, two 200-gram samples of crude urea slurry were charged into copper-lined pressure tubes. One charge was untreated, the other was stabilized with 0.1% by weight of caffeine. Both were heated under autogenous pressure for 60 minutes at 120°, after which the product was analyzed for urea. 37% of the unstabilized, and 99% of the stabilized urea were recovered.

*Example 5*

The experiment outlined under Example 3 was repeated, except that theobromine was substituted for caffeine as a stabilizer. 82% of the stabilized and 37% of the unstabilized urea were recovered.

*Example 6*

A 190 gram sample of methyl hydroxyacetate was heated under high reflux in a glass flask for five hours. 17 cc. of by-product methanol were recovered while the vapor temperature remained constantly at the boiling point of pure methanol, 64.7°. To a second batch of equal weight was added 0.1% caffeine. During five hours of heating at the same temperature (oil bath at 168–170°) less than 0.3 cc. of methanol was produced.

*Example 7*

The procedure of Example 7 was repeated with a 200 gram sample of ethyl lactate. In the absence of stabilizer the vapor temperature remained at the boiling point of ethanol, 78.5°. At the end of 12 hours 2.0 grams of ethanol were removed before an increase in the head temperature was observed. In the presence of 0.1% caffeine, no ethanol was recovered from ethyl lactate after 12 hours of heating.

*Example 8*

Commercial formamide was distilled from a

Pyrex glass nitrogen-filled distilling flask into an ice-cooled distilling flask acting as a receiver. In the presence of 1% caffeine, foreshots constituting 1% of the total charge were removed. At a constant head temperature of 209.5 to 209.8° C., 50% of the material was then distilled with low reflux. The distillate and hot residue were water white.

The experiment was repeated in the absence of caffeine. Despite more uniform boil-up, the head temperature fluctuated between 205.6° C. and 208.5° C. The distillate was red and the vent gases gave a strong odor of HCN and $NH_3$.

Example 9

A sample of redistilled adiponitrile was heated in a steel tube for 24 hours at 188°. In a parallel test a second sample of nitrile from the same source was treated with 0.01% caffeine and heated for 24 hours at 205°. In spite of the higher temperature, stabilization reduced decomposition by 94%.

Various changes may be made in the methods and preferred embodiments of this invention without departing therefrom or sacrificing any of the advantages thereof.

I claim:

1. A stabilized solid composition of matter, urea containing from 0.0001 to 1.0% by weight of caffeine.

2. A stabilized solid composition of matter, urea containing from 0.001 to 1.0% by weight of a compound selected from the group consisting of caffeine and theobromine.

3. A stabilized solid composition of matter, urea containing from 0.0001 to 1.0% by weight of theobromine.

EDWARD C. KIRKPATRICK.